United States Patent [19]

Gray et al.

[11] Patent Number: 4,885,141

[45] Date of Patent: Dec. 5, 1989

[54] WATER TREATMENT IN AQUEOUS HEAT TRANSFER APPARATUS

[75] Inventors: Alan Gray, Amersham; Alfred J. Arch, Ongar, both of England

[73] Assignee: Alcan International Limited, Montreal, Canada

[21] Appl. No.: 193,881

[22] Filed: May 13, 1988

[30] Foreign Application Priority Data

May 22, 1987 [GB] United Kingdom ............... 8712198

[51] Int. Cl.⁴ ............................................. B01D 11/02
[52] U.S. Cl. .................................... 422/263; 137/268; 165/134.1; 210/198.1; 222/54; 422/266
[58] Field of Search ................... 137/268; 165/134.1; 210/192, 198.1, 205; 222/54; 422/263, 266, 7; 4/226-228, 231

[56] References Cited

U.S. PATENT DOCUMENTS

| 3,199,665 | 8/1965 | Eriksson | 206/0.5 |
| 3,522,882 | 8/1970 | Dykes | 210/198.1 |
| 3,869,069 | 3/1975 | Levey et al. | 222/180 |
| 4,040,515 | 8/1977 | Hessel et al. | 206/0.5 |
| 4,333,516 | 6/1982 | Krueger | 165/1 |
| 4,357,236 | 11/1982 | Krueger | 165/134.1 |
| 4,402,912 | 9/1983 | Krueger et al. | 137/268 |
| 4,497,364 | 2/1985 | Cheadle et al. | 165/134.1 |
| 4,777,670 | 10/1988 | Klinkhammer et al. | 422/266 |

FOREIGN PATENT DOCUMENTS

| 504692 | 8/1951 | Belgium . |
| 0083571 | 7/1983 | European Pat. Off. . |
| 0142038 | 5/1985 | European Pat. Off. . |
| 0242053 | 10/1987 | European Pat. Off. . |
| 2649000 | 3/1978 | Fed. Rep. of Germany . |
| 382212 | 10/1932 | United Kingdom . |
| 691578 | 8/1951 | United Kingdom . |

Primary Examiner—Peter Hruskoci
Attorney, Agent, or Firm—Cooper & Dunham

[57] ABSTRACT

A capsule 1 (FIG. 1) for the treatment of water in an aqueous heat transfer apparatus comprises open top compartments 2, 3 and lugs 6 to bear against and grip the inside of a passage in which the capsule is located. The open tops of the compartments are closed by means of covers of controlled release glass which dissolve in water at different rates. The capsule can be arranged to release a first dose of corrosion inhibitor on exposure to water under relatively milder conditions and a second dose of corrosion inhibitor on exposure to water under relatively severer conditions.

8 Claims, 3 Drawing Sheets

WATER TREATMENT IN AQUEOUS HEAT TRANSFER APPARATUS

This invention relates to the treatment of water in aqueous heat transfer apparatus e.g. in which metal surfaces are exposed to circulating water. It is of interest in connection with the operation of water circulatory systems such as central heating systems, solar panels, air conditioning equipment and particularly central heating systems employing hot water radiators made of aluminium. As is well known, corrosion of metals may occur in such systems, due to two main causes. The first is oxidic corrosion resulting from oxidising species carried by the circulating water. The second is galvanic corrosion resulting from the electrical potential existing between two different metals or between two different conditions of the same metal. To mitigate these problems, it is standard practice to incorporate corrosion inhibitors in circulating water systems at the time they are commissioned.

As well as corrosion treatment, other treatments may be carried out as well as or instead of inhibition of corrosion. For example, biocides and bactericides might be added to kill biological organisms which might otherwise reduce heat transfer efficiency by forming sludges or deposits. Formaldehyde is one possible additive for these purposes, and there are a number of suitable proprietary substances available.

In central heating installations it is common practice to drain down the system, following initial firing to test for leaks, to remove any residual flux or other contaminant collected during installation. This draining down can remove any added treatment substance, and hence remove any protection, along with the circulating water. For example, it is known that low concentrations of some proprietary inhibitors can actually promote corrosion.

That problem might be solved by the use of a delayed-release capsule, designed to release corrosion inhibitor only after immersion in water at elevated temperature for a significant length of time. However, that expedient would not provide effective corrosion protection if, as is often the case when central heating systems are installed during the summer months, the system was simply filled with cold water and never fired up to its normal operating temperature.

These problems could be avoided by repeated additions of corrosion inhibitor to the circulating water system; but such additions would be expensive, inconvenient and difficult to monitor. What is needed is a means of adding corrosion inhibitor at one time which will provide corrosion protection under any of the various different installation procedures commonly used. Such means can only be provided by two or more components adapted to release corrosion inhibitor under different conditions.

Our co-pending application serial number based on GB 8707004 filed Mar. 24, 1987 describes an apparatus and method which provides an aqueous heat transfer apparatus, which apparatus contains a multi-component corrosion protection system including a first component adapted to release a corrosion inhibitor on exposure to water under relatively milder conditions and a second component adapted to release a corrosion inhibitor on exposure to water under relatively severer conditions. As noted above, the invention is particularly, but not exclusively, applicable to central heating systems in which the corrosion protection system is contained in a (or each) hot water radiator.

A particular arrangement described is a multiple acting device comprising corrosion inhibitor contained in at least two compartments closed by different controlled release glasses. The present invention is particularly concerned with this type of arrangement and is particularly adapted for use in water circulatory systems, for example central heating systems.

The invention provides a capsule for the treatment of water in an aqueous heat transfer apparatus, said capsule comprising a container of at least two separate compartments and locating means attached to the container for securely locating the capsule within a passage forming part of the heat transfer apparatus, each said compartment having at least one surface open to the exterior, each said surface being covered by a cover, and retaining means for retaining each cover in position to form a sealed compartment for containing a water treatment material, each said cover and/or each said retaining means being formed of a controlled release glass, whereby on exposure of the capsule to water the controlled release glass slowly dissolves, the time taken for at least one controlled release glass cover or retaining means to dissolve being different from that for the remainder. Preferably, each cover is formed of controlled release glass and each retaining means is sealing means for sealing by attaching the cover to its respective compartment.

The time taken for the cover to dissolve is governed by the thickness of the glass, and by its structure. Controlled release glasses which were developed by STC Technology Limited and are marketed by Chance Pilkington Ltd., consist of an open framework of the glass-forming oxide linked, in the case of $P_2O_5$, by P—O—P bonds extending throughout the structure. When the glass is contacted by water or other aqueous medium, a chemical reaction at the glass-water interface breaks the P—O—P bonds and phosphate ions are released into the solution. The rate of dissolution is determined by the strength of the bonds, and glasses may be formulated to dissolve at any desired controlled rate in water of specified pH and temperature. Controlled release glasses dissolve at a constant rate (with zero-order kinetics) since a new surface is continuously being formed, and leave no residue.

In use, the capsule is placed in a passage through which water flows so that the material within the two compartments is released after a period of time as water flows along the passage. Typically, the capsule is fitted within a connecting pipe, or within the radiator itself. The latter is particularly preferred since the capsule can be fitted during manufacture of the radiator and thus cannot easily be removed or tampered with during installation. Furthermore, the presence of the capsule can be used to improve the water flow characteristics in certain styles of radiator, as will be explained below.

Preferably means are provided for securely locating the capsule within its passage so that it is not subject to movement during water flow. Such means may comprise gripping means such as protruding lugs which grip the walls of the passage sufficiently tightly to prevent movement in use. In an embodiment of the invention the gripping means comprises protruding strippable lugs made of plastics material which are distorted or sheared in an inwards direction as the capsule is pushed into the passage during fitting such as to provide a secure friction fit in use.

In case of movement in use, a preferred embodiment of the capsule incorporates spacer means protruding from the main body of the container in the general direction of the passage, said spacer means being positioned so as to prevent the main body of the container moving to a position flat against a restriction or similar variation in the passage which might otherwise cause the capsule to block the flow of water.

The container is formed with at least two compartments each containing an appropriate treatment substance, such as corrosion inhibitor. The particular material used can be identical for all compartments, or may be different. Examples of suitable corrosion inhibitor materials are sodium mercaptobenzythiazole (smbt) and benzotriazole, both of which are copper passivators; filming amines such as alkyl propylene amines for passivating aluminium; finely divided magnetite, also for passivating aluminium; molydates, phosphates and nitrates for passivation of steel. Mixtures of corrosion inhibitors may be used. In addition other water treatment agents such as biocides (e.g. formaldehyde) and sequesterents (e.g. boroheptonate) may be included either in admixture with the corrosion inhibitors or separately for independent release.

The rate of dissolution of the respective compartment covers can be set to suit the particular circumstances of use. For example, in a central heating system, it may be arranged that the cover of one compartment dissolves to release the contents fairly quickly—indeed, almost as soon as water is introduced into the system for the first time—so that the system is protected against corrosion during the initial flushing to remove debris and flux residue etc. The remaining compartment or compartments may be arranged to release their contents relatively more slowly—after the initial flushing, and once the system has been commissioned.

The capsule may be made from any material which is thermally and dimensionally stable at the temperatures operating in the circulatory system. An example is an acetal copolymer such as KEMATAL. A typical method of manufacture would be by way of injection moulding.

BRIEF DESCRIPTION OF THE DRAWINGS

In order that the invention may be better understood an embodiment thereof will now be described by way of example only and with reference to the accompanying drawings in which.

Figure 1:
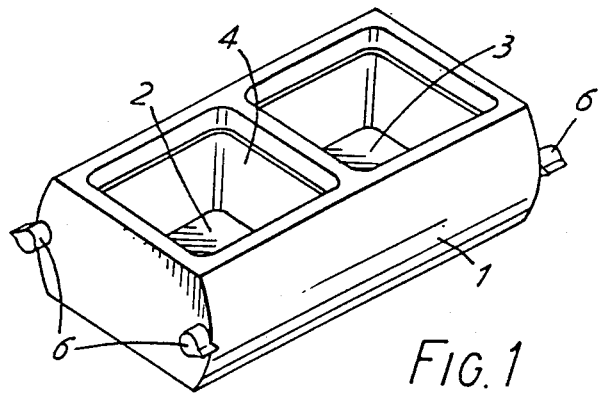
FIGS. 1, 2 and 3 are a perspective view, plan view and an end elevation respectively of a two-compartment capsule according to the invention.

The capsule comprises an injection moulded body 1 of plastics material such as an acetal copolymer. The body defines a container having two compartments 2, 3 separated by an integral wall 4. Each compartment has a bottom and sidewalls, and an open top. A shoulder 5 is formed around the top edge to locate a respective lid 5a (FIG. 4) for each compartment. The compartments are filled with an appropriate treatment agent, assumed to be a corrosion inhibiting material (not shown) and the lids bonded or otherwise attached in place so forming two sealed cavities in which the corrosion inhibiting material is located.

The lids are made from controlled release glass which has the property of gradually dissolving in water. One of the lids is made of a glass which dissolves relatively rapidly (e.g. up to 48 hours) in cold water—i.e. water at ambient temperature—while the other lid dissolves relatively rapidly (e.g. 2 to 50 days) in hot water (greater than 30° C.) but does not dissolve in cold water or does so to a negligible degree. Thus, when the capsule is immersed in water, one lid is arranged to dissolve quite quickly to thus release the contents of its compartment and give early protection to the circulatory system during the initial flushing stage which is (or should be) carried out during commissioning of the system. After flushing, the system is refilled and the second lid dissolves, eventually releasing the contents of its compartment and providing long-lasting protection in the system.

Figure 2:
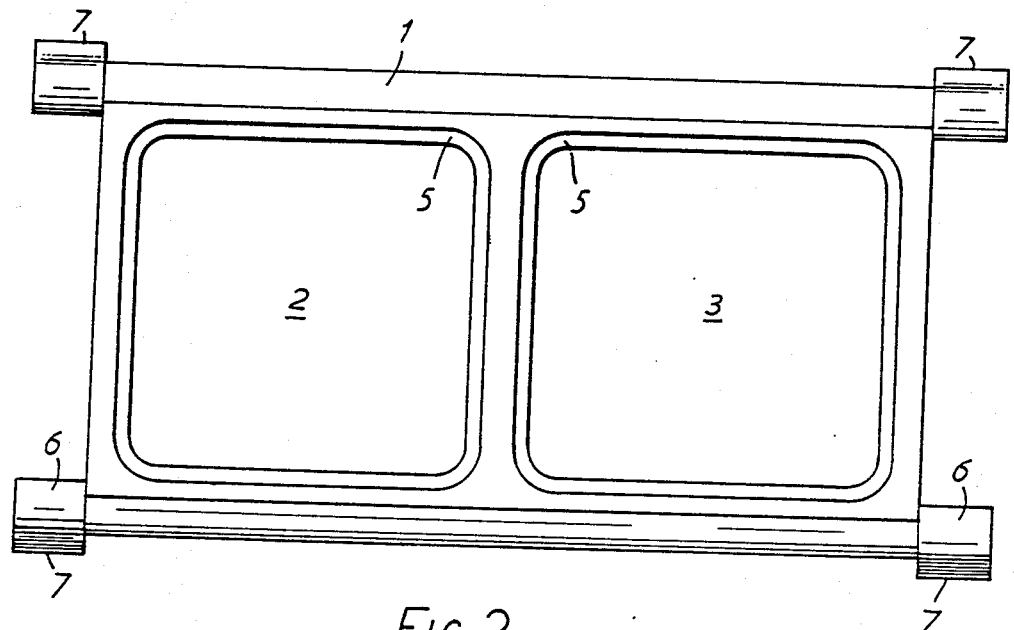
Figure 3:
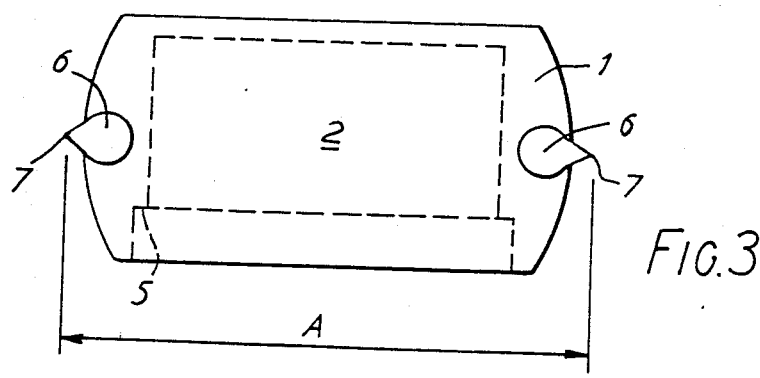

The capsule is inserted into a water-carrying part of the system, and is lodged in place by means of four lugs 6 which bear against and grip the inside surface of the passageway in which the capsule is situated. These lugs, which in the preferred embodiment are formed integrally with body 1, protrude both radially outwardly from the major axis of the body (FIG. 3), but also outwardly in a direction parallel to that axis (FIG. 2). The radially outward-most portion of the lug is brought to an edge 7, and the distance A between the oppositely disposed edges 7 is such as to be slightly larger than the expected passage diameter so that the lug tends to strip and bend inwards as it is pushed into the passage to provide a tight grip without distorting the main part of the capsule body.

Should the capsule ever become dislodged within its passage, there is a danger that it might move towards and block a narrowed portion of the passageway. To prevent this, the lugs 6 protrude axially so that they, rather than the main body of the capsule will, in these circumstances, abut the shoulder defining the narrowed portion, thus ensuring a continued, if slightly restricted, passage for water.

The capsule is orientated within its passageway such that the water flow is in the plane of the major axis of the capsule. This facilitates discharge of the contents, once the glass has dissolved, due to the impingement of the flowing water on the exposed surface of the compacted material within the compartment. Although the compartments are shown as having a bottom integral with the body 1, it will be clear that the compartments could have neither bottom nor top, in which case the controlled release glass lids are used both top and bottom.

The lids could also be placed on the ends of the capsule—i.e. facing the direction of flow of the advancing or retreating water. In such a case, the partition between the two compartments could be made of controlled release glass having a relatively slow release rate so that, eventually, a complete flow through from one end of the capsule to the other is achieved, and good flushing of the treatment agent is ensured.

Figure 4:
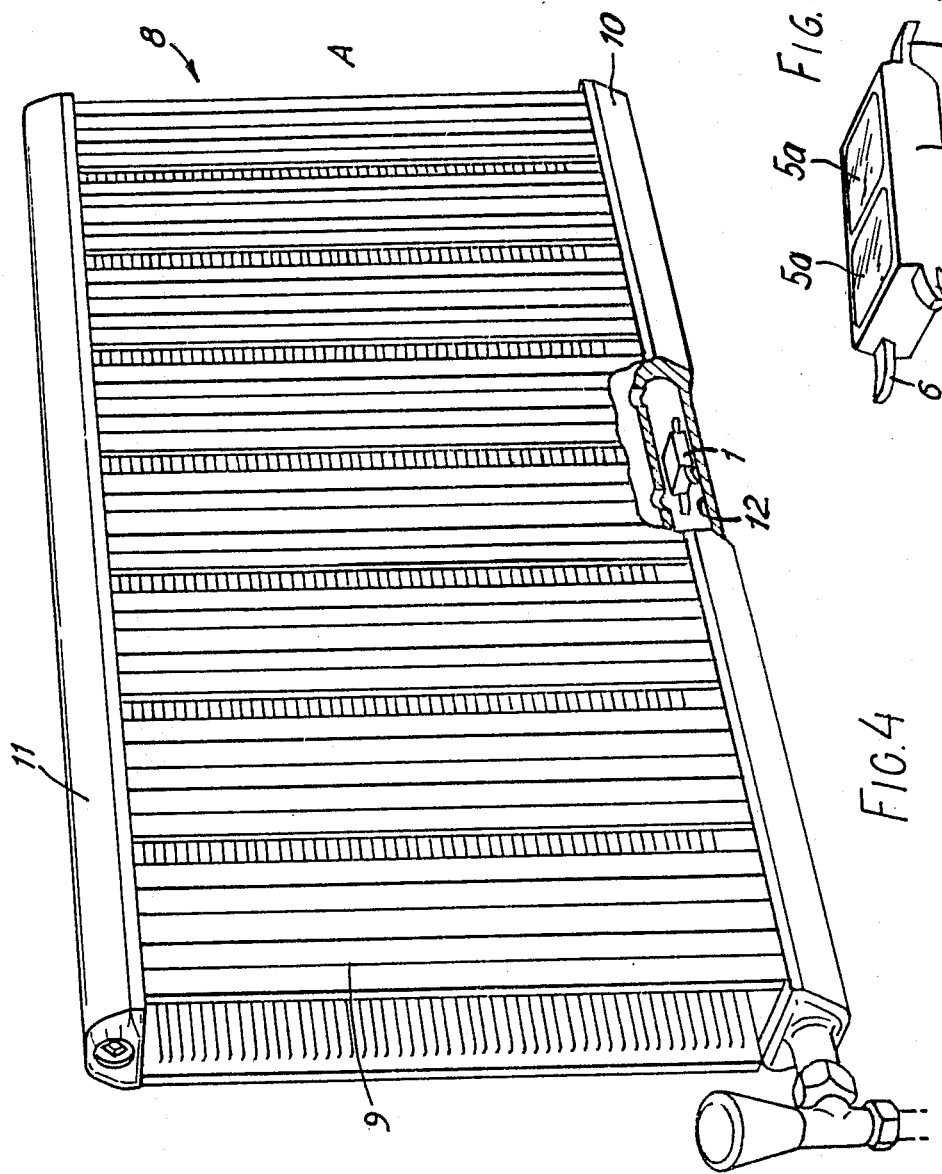
FIG. 4 is a perspective view of a radiator to illustrate the typical positioning of the capsule within the radiator.

By way of example, FIG. 4 shows diagrammatically how the treatment capsule of the invention can be fitted within a central heating radiator, shown under reference 8. The radiator shown is of the type incorporating horizontal upper and lower header tubes 11,10 with vertical finned tubes 9 extending between the two. The capsule is fitted in the lower header 10 at a position such as to tend to direct water flow up the leftmost finned tubes, as well as straight on, along the header. Thus water flow throughout the radiator is improved and the heat output likewise improved. This type of radiator is in fact intended to be connected so that the water input and output connections are not at the same level. However, in conventional plumbing practice, both radiator connections are made at the bottom and with this type of radiator such a connection can lead to poor performance because the easiest route for water flow is straight along the bottom header. By acting as a "baffle" within the bottom header tube, the flow of water through the finned tubes 9 is encouraged, thus improving the performance of the radiator. With the capsule in the position shown, flow rates along the bottom header can be reduced by as much as 60%.

FIG. 4 further shows at (B) a modified form of capsule in which the lugs 6 protrude from the end surfaces of the capsule in a curved manner both axially and radially. Such lugs are bent inwards as the capsule is inserted into the header and firmly grip the inside surface 12 to prevent movement. Other similar configurations will be apparent to those skilled in the art.

Figure 5:
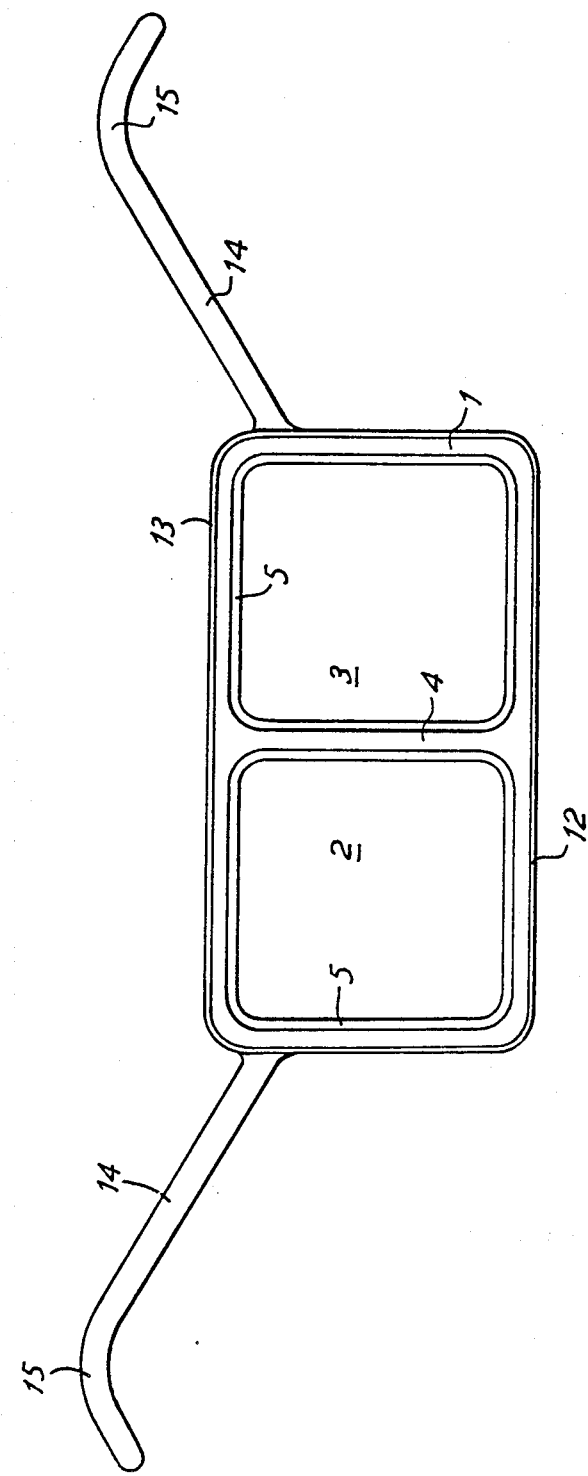
FIG. 5 is a plan view corresponding to FIG. 2 but of a different capsule according to the invention.

FIG. 5 shows a different capsule comprising a body 1 which defines a container having two compartments 2,3 separated by a wall 4. Each compartment has a bottom and sidewalls, and an open top. A shoulder 5 is formed around the top edge to locate a respective lid (not shown) for each compartment. The side walls 12, 13 of the body are flat rather than convex as in FIGS. 1 to 3.

The capsule includes two arms 14 which protrude from the end walls of the container in a direction making an angle of 30° with its longitudinal axis. Towards their outer ends, the arms are curved inwards at 15 towards the longitudinal axis. The arms 14 are made somewhat flexible.

The capsule is designed to be a friction fit in a pipe with the curved portions 15 of the arm and the side wall 12 contacting opposite surfaces of the pipe.

EXAMPLE

An injection moulded KEMETAL (trade mark of Celanese Corp) box shaped capsule, as illustrated in FIG. 5 and measuring 31 mm long by 20 mm wide by 10 mm deep adapted to fit inside a header pipe of a domestic radiator, was used in these tests. The capsule contained two separate compartments each sealed by a lid of controlled release glass. The glass sealing the first compartment was chosen to dissolve relatively rapidly in water at room temperature whereas the glass sealing the second compartment required a longer time and high temperature to dissolve. Each compartment contained a pellet of inhibitor weighing 1.40 g made by compressing a solid mixture containing 70% Sodium Mercaptobenzthiazole 15% Magnetite and 15% Sodium lauryl sulphate.

When the capsules were placed in water at 25±2° C. the contents of the first compartment were released after 7 to 15 hours. The water was then heated to 45±2° C. and held at that temperature until the contents of the second compartment were released. This occurred after 160 to 210 hours.

We claim:

1. A capsule for the treatment of water in an aqueous heat transfer apparatus, said capsule comprising a container of at least two separate compartments, a water treatment material contained in each of said compartments, and locating means attached to the container for securely locating the capsule within a passage forming part of the heat transfer apparatus, each said compartment having at last one surface open to the exterior, each said surface being covered by a cover, and retaining means for retaining each cover in position to form a sealed compartment for containing said water treatment material, each said cover being formed of a controlled release glass which dissolves upon exposure of the capsule to water to release said water treatment material from said compartment, the time taken for at least one controlled release glass cover to dissolve being different from that for the remainder.

2. A capsule as claimed in claim 1, wherein the retaining means for retaining each cover as aforesaid is sealing means for sealingly attaching each said cover to its respective compartment.

3. A capsule as claimed in claim 1, wherein said locating means comprises at least one arm attached to the container and extending away therefrom to grip the inside surface of the passage within which the capsule is located.

4. A capsule as claimed in claim 3 wherein said arm extends away from the container in a direction such as to protrude from an end wall to thus act both as a locating means and as a spacer means.

5. A capsule as claimed in claim 1, wherein the container is generally rectangular in shape, being longer in the direction of the axis of a passage in which it is intended to be placed, and has end walls respectively facing the direction of oncoming and retreating water flow within said passage, said container being further provided with spacer means protruding from at least one of said end walls for ensuring the spacing of that end wall from irregularities in the passage.

6. A capsule as claimed in claim 1, wherein the container is made from a material which is thermally and dimensionally stable at the expected operating temperature and such as will remain in the passage after the water treatment material has been dispersed to continue to affect water flow by acting as a baffle within the passage.

7. A capsule as claimed in claim 1, wherein the water treatment material comprises or includes a corrosion inhibitor.

8. A capsule as claimed in claim 1, wherein the water treatment material comprises or includes a biocide or bactericide.

* * * * *